(12) United States Patent
Al-Haddad et al.

(10) Patent No.: US 9,882,524 B2
(45) Date of Patent: *Jan. 30, 2018

(54) SOLAR PANEL TRUSS MOUNTING SYSTEMS AND METHODS

(71) Applicants: Georgia Tech Research Corporation, Atlanta, GA (US); Radiance Solar, LLC, Atlanta, GA (US)

(72) Inventors: Tristan Farris Al-Haddad, Clarkson, GA (US); Andrés Cavieres, Atlanta, GA (US); Russell Gentry, Decatur, GA (US); Joseph Goodman, Atlanta, GA (US); Wade Nolan, Birmingham, GA (US); Taylor Pitelka, Atlanta, GA (US); Keyan Rahimzadeh, Atlanta, GA (US); Bradley Brooks, Atlanta, GA (US); Joshua Lohr, Atlanta, GA (US); Ryan Crooks, Atlanta, GA (US); Jamie Porges, Atlanta, GA (US); Daniel Rubin, Atlanta, GA (US)

(73) Assignees: Georgia Tech Research Corporation, Atlanta, GA (US); Radiance Solar, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,326

(22) Filed: Mar. 14, 2016

(65) Prior Publication Data

US 2016/0204731 A1    Jul. 14, 2016

Related U.S. Application Data

(62) Division of application No. 14/849,835, filed on Sep. 10, 2015, now Pat. No. 9,379,660, which is a division (Continued)

(51) Int. Cl.
*H02S 20/10* (2014.01)
*F24J 2/52* (2006.01)
(Continued)

(52) U.S. Cl.
CPC ............... *H02S 20/10* (2014.12); *E04B 1/19* (2013.01); *E04C 3/02* (2013.01); *F16M 11/00* (2013.01);
(Continued)

(58) Field of Classification Search
CPC .......... H02S 20/10; H02S 20/30; H02S 20/00; F16M 11/00; E04B 1/19;
(Continued)

(56) References Cited

U.S. PATENT DOCUMENTS

| 2,911,686 A | 11/1959 | Wukasch |
| 3,940,771 A | 2/1976 | Wild |

(Continued)

*Primary Examiner* — Brian E Glessner
*Assistant Examiner* — Omar F Hijaz
(74) *Attorney, Agent, or Firm* — Morris, Manning & Martin, LLP; Daniel E. Sineway, Esq.; Lee Strasburger, Esq.

(57) ABSTRACT

An exemplary embodiment of the present invention provides a solar panel truss mounting system comprising a base and a truss assembly coupled to the base. The truss assembly comprises a first panel rail mount, second panel rail mount parallel to the first panel rail mount, base rail mount parallel to the first and second panel rail mounts, and a plurality of support members. A first portion of the plurality of support members extends between the first and second panel rail mounts. A second portion of the plurality of support members extends between the first panel rail mount and the base rail mount. A third portion of the plurality of support members extends between the second panel rail mount and the base rail mount. The system can further comprise a plurality of connectors for coupling a plurality of photovoltaic solar panels to the truss assembly.

4 Claims, 13 Drawing Sheets

Related U.S. Application Data of application No. 14/043,793, filed on Oct. 1, 2013, now Pat. No. 9,163,861.

(60) Provisional application No. 61/708,147, filed on Oct. 1, 2012.

(51) Int. Cl.
| | |
|---|---|
| *F16M 11/00* | (2006.01) |
| *E04B 1/19* | (2006.01) |
| *E04C 3/02* | (2006.01) |
| *A47J 47/16* | (2006.01) |
| *H02S 20/00* | (2014.01) |
| *H02S 20/30* | (2014.01) |

(52) U.S. Cl.
CPC .............. *F24J 2/523* (2013.01); *F24J 2/525* (2013.01); *F24J 2/526* (2013.01); *H02S 20/00* (2013.01); *H02S 20/30* (2014.12); *A47J 47/16* (2013.01); *E04B 2001/193* (2013.01); *E04B 2001/1957* (2013.01); *Y02E 10/47* (2013.01); *Y02E 10/50* (2013.01)

(58) Field of Classification Search
CPC ....... E04B 2001/1957; E04B 2001/193; E04C 3/02; F24J 2/523; F24J 2/526; F24J 2/525
See application file for complete search history.

(56) References Cited

U.S. PATENT DOCUMENTS

| | | | | |
|---|---|---|---|---|
| 4,007,563 | A * | 2/1977 | Nakagawa | ............ E04D 3/3606 52/334 |
| 4,421,943 | A | 12/1983 | Withjack | |
| 4,445,303 | A * | 5/1984 | Judkins | ................. E04B 1/4121 52/699 |
| 5,228,924 | A | 7/1993 | Barker et al. | |
| 5,428,936 | A * | 7/1995 | Roth | ......................... E04B 9/18 248/327 |
| 5,890,332 | A * | 4/1999 | Skidmore | ................. E04B 2/08 52/271 |
| 6,367,205 | B2 * | 4/2002 | Cornett, Sr. | ............. E04B 7/02 52/223.13 |
| 7,985,041 | B2 * | 7/2011 | Lin | ......................... F16B 37/00 411/388 |
| 8,188,414 | B2 * | 5/2012 | Linke | ..................... F24J 2/5239 126/623 |
| 8,201,381 | B2 * | 6/2012 | Heath | ................... E04B 1/4157 52/698 |
| 8,534,007 | B2 | 9/2013 | Almy et al. | |
| 8,667,633 | B2 | 3/2014 | De La Chevrotiere | |
| 8,684,190 | B2 | 4/2014 | Abar | |
| 8,776,781 | B2 * | 7/2014 | Meydbray | .............. F24J 2/5417 126/600 |
| 8,887,470 | B2 | 11/2014 | Werner et al. | |
| 8,936,164 | B2 | 1/2015 | Durney et al. | |
| D739,819 | S | 9/2015 | Hannum | |
| 2004/0144055 | A1 | 7/2004 | Lewison | |
| 2005/0066609 | A1 | 3/2005 | Olah | |
| 2005/0086893 | A1 | 4/2005 | Moody et al. | |
| 2006/0032178 | A1 | 2/2006 | Jensen | |
| 2006/0053726 | A1 | 3/2006 | Reynolds et al. | |
| 2007/0011983 | A1 | 1/2007 | Reynolds et al. | |
| 2007/0044415 | A1 | 3/2007 | Merrifield et al. | |
| 2007/0113511 | A1 | 5/2007 | Greiner | |
| 2007/0261355 | A1 | 11/2007 | Carlisle et al. | |
| 2010/0077679 | A1 | 4/2010 | Sagayama | |
| 2010/0132769 | A1 | 6/2010 | Potter et al. | |
| 2010/0237028 | A1 | 9/2010 | Cusson | |
| 2010/0237029 | A1 | 9/2010 | Cusson et al. | |
| 2011/0024582 | A1 | 2/2011 | Gies et al. | |
| 2011/0174748 | A1 | 7/2011 | Civit Vidal | |
| 2011/0194900 | A1 | 8/2011 | French | |
| 2011/0220596 | A1 | 9/2011 | Cusson et al. | |
| 2011/0252724 | A1 | 10/2011 | Heisler | |
| 2012/0036717 | A1 | 2/2012 | Belikoff et al. | |
| 2012/0061337 | A1 | 3/2012 | Seery et al. | |
| 2012/0091077 | A1 | 4/2012 | Zuritis | |
| 2012/0131916 | A1 | 5/2012 | Reynolds | |
| 2012/0145228 | A1 | 6/2012 | Miros et al. | |
| 2012/0217209 | A1 | 8/2012 | Marcotte et al. | |
| 2012/0223033 | A1 | 9/2012 | Molek | |
| 2012/0267328 | A1 | 10/2012 | McPheeters | |
| 2013/0009025 | A1 * | 1/2013 | Stearns | ................... E04D 13/10 248/237 |
| 2013/0020267 | A1 | 1/2013 | Plaisted et al. | |
| 2013/0048583 | A1 | 2/2013 | Kruse | |
| 2013/0167907 | A1 | 7/2013 | Bitarchas et al. | |
| 2013/0200016 | A1 | 8/2013 | Lewenz et al. | |
| 2013/0206712 | A1 | 8/2013 | Magalhaes et al. | |
| 2013/0334152 | A1 | 12/2013 | Thurner et al. | |
| 2014/0069483 | A1 * | 3/2014 | Wolter | ................ H01L 31/0422 136/246 |
| 2014/0102996 | A1 | 4/2014 | Pelman | |
| 2014/0124018 | A1 | 5/2014 | Goodman et al. | |
| 2014/0224751 | A1 | 8/2014 | Sawaki | |
| 2014/0284292 | A1 | 9/2014 | Pantel | |
| 2014/0294493 | A1 | 10/2014 | Cavieres et al. | |
| 2014/0305887 | A1 | 10/2014 | Zuritis | |
| 2014/0332059 | A1 | 11/2014 | Shea et al. | |
| 2015/0027970 | A1 | 1/2015 | Werner et al. | |
| 2015/0034575 | A1 | 2/2015 | Warpup et al. | |
| 2015/0101996 | A1 | 4/2015 | Nayar | |
| 2015/0101997 | A1 | 4/2015 | Liu et al. | |
| 2015/0109695 | A1 | 4/2015 | Blumenthal et al. | |

* cited by examiner

TOP NODE
PANEL UP

APEX NODE
AXIAL TENSION / COMPRESSION
BENDING

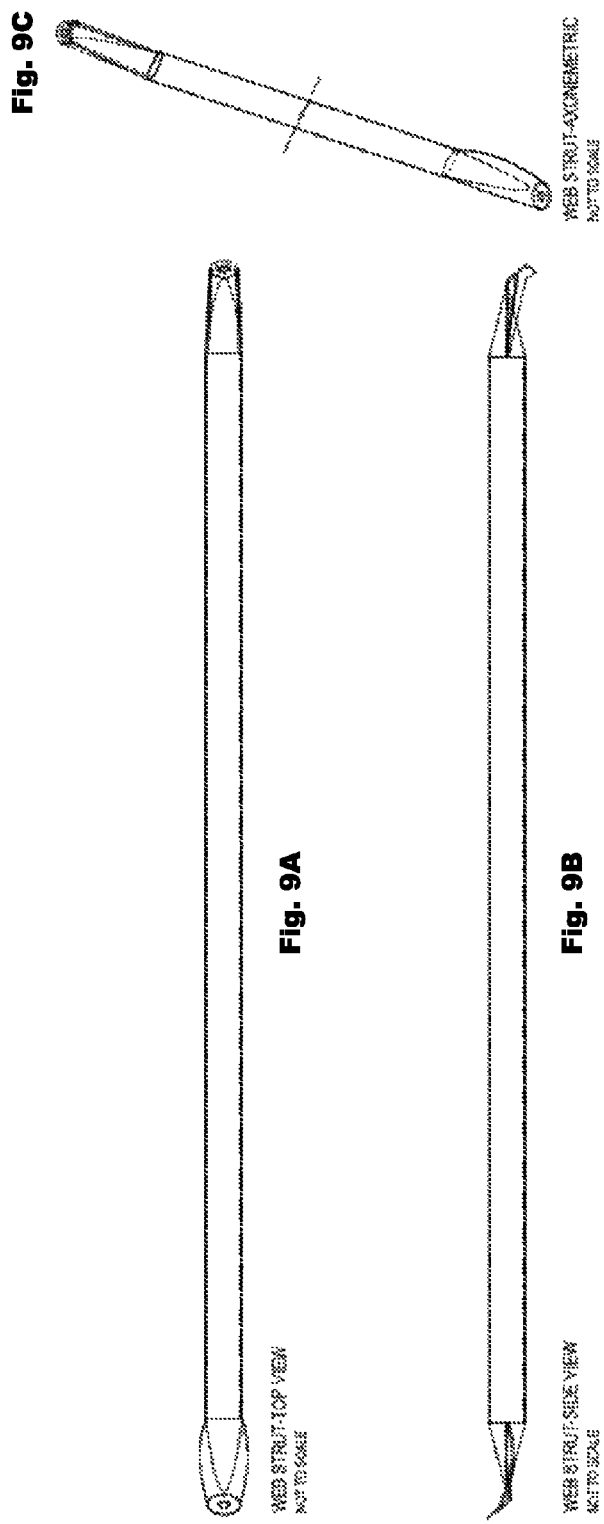

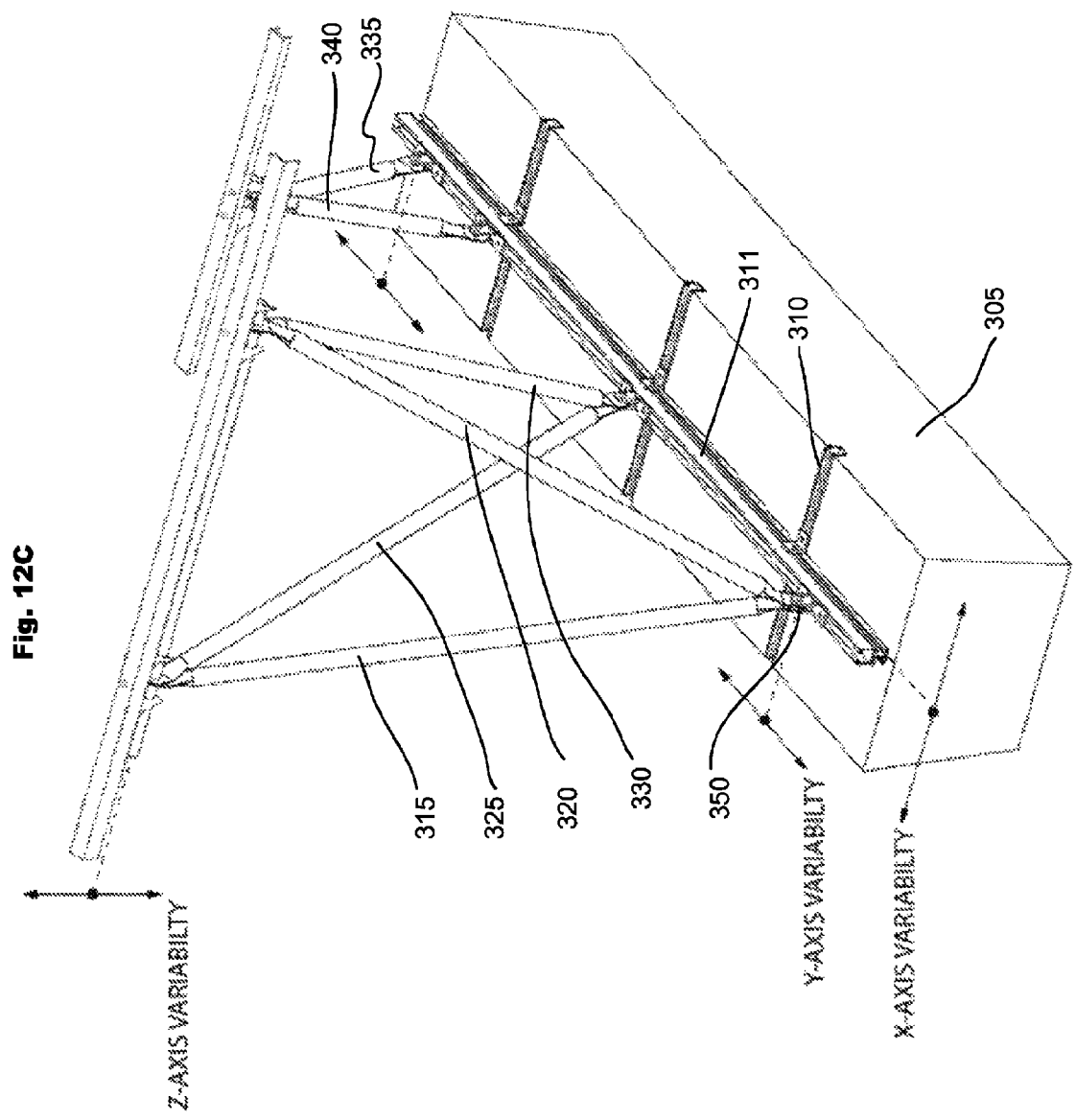

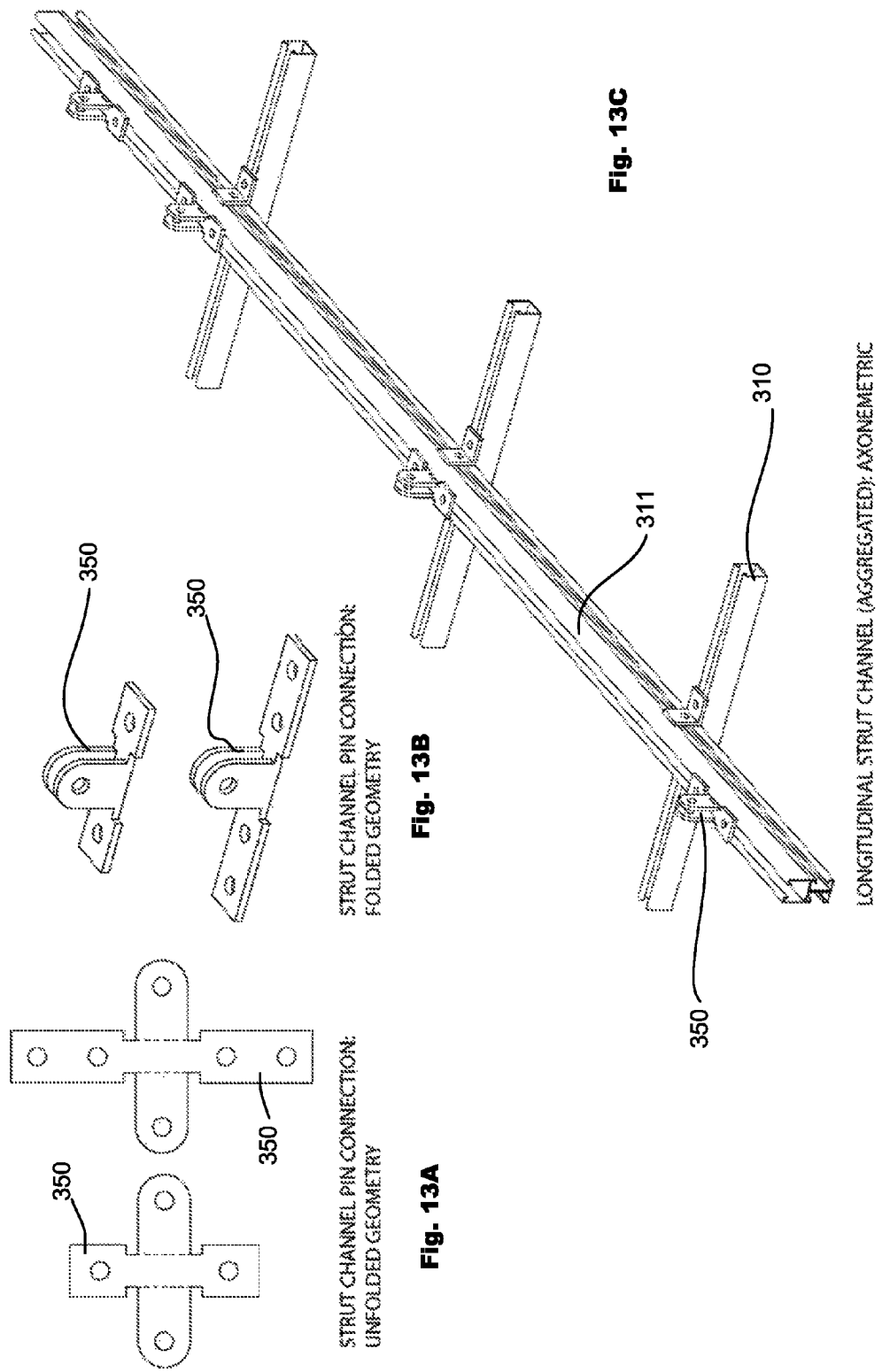

SOLAR PANEL TRUSS MOUNTING SYSTEMS AND METHODS

CROSS REFERENCE TO RELATED APPLICATIONS

This application claims is a divisional application of, and claims the benefit of and priority to, U.S. patent application Ser. No. 14/849,835, filed on Sep. 10, 2015, entitled "Solar Panel Truss Mounting Systems and Methods", which is a divisional application of U.S. patent application Ser. No. 14/043,793, filed on Oct. 1, 2013, entitled "Solar Panel Truss Mounting Systems and Methods", which claims the benefit of and priority to, U.S. Provisional Patent Application No. 61/708,147, filed Oct. 1, 2012, entitled "Prefabricated Pyramid Truss Mounting, Racking, and Structural System for Photovoltaic Arrays", all of which are incorporated herein by reference in their entireties.

FEDERALLY SPONSORED RESEARCH STATEMENT

The invention described in this patent application was made with Government support under Agreement No. DE-EE0005441, awarded by the Department of Energy. The Government has certain rights in the invention described in this patent application.

TECHNICAL FIELD OF THE INVENTION

The various embodiments of the present disclosure relate generally to mounting systems and methods. More particularly, the various embodiments of the present invention are directed to solar panel truss mounting systems and methods.

BACKGROUND OF THE INVENTION

In the United States alone, the market for solar PVs has grown by 800% from 2005 to 2012, with installed capacity rising from 4.5 GW to 65 GW. At this rate, it is expected that the cost of alternative generation of electricity could become equal to or cheaper than conventional generation in the near future. To reach this goal, known as grid parity, it is necessary to push the cost of PV systems down by 50-75%. Historically, the cost structure of solar PV systems was dominated by the cost of silicon cells. In 2012, given the significant decrease in cost of raw silica, the market has seen PV module prices dropping from $4.00 per Watt to $1.00 per Watt in 2012.

However, focusing efforts solely on efficient utilization of silicon is no longer a viable long-term strategy for maintaining the market growth rates. Module prices might be expected to decrease another 30%, but this alone will not drive the system cost to grid parity. Experts agree that the most significant contribution needs to come from a drastic reduction of the "balance of system cost." Balance of System ("BoS") costs are all costs associated with a PV system, except the cost of the PV modules and the inverters. They encompass all auxiliary components that allow the system to function, as well as labor costs and soft costs required to implement a solar system project. From the hardware side, BOS includes mounting and racking hardware, electrical wiring, interconnects, and monitoring equipment; labor costs include mounting, racking, and electrical labor; soft costs include permitting, inspection, grid tie hardware, overhead, and profit. Currently, BoS costs account for more than 40 percent of the total installed cost of solar energy systems.

In recognition of the potential of solar PVs to contribute to US energy independence and security goals, the United States Department of Energy ("DoE") launched the SunShot initiative in 2010. The SunShot initiative aims to decrease the cost of solar energy by 75% by the end of the decade, to be achieved by reducing technology costs, grid integration costs, and accelerating solar deployment by reducing utility scale solar PV to $1 per Watt. Given the diffuse cost structure of solar PV systems, there is the need to recognize that no single component can accomplish alone the SunShot cost reduction objective. Instead, multiple cost drivers must be concurrently addressed, including material cost, manufacturing cost, business process, on site labor and equipment usage. This condition implies the need to identify new opportunities for systems integration that could eventually lead to more significant innovation in the field.

One strategy to deal with the complexity of BoS is a "divide and conquer" approach. This strategy entails the optimization of individual components and activities, launching isolated cost reduction efforts. A benefit of this approach is that it allows a high number of stakeholders to engage in relatively low complexity tasks. The downside is the high cost of maintaining compatibility standards between sub-systems, while missing the opportunity to achieve more innovative solutions through development of multifunctional components. Alternatively, a systems design approach revisits the requirements from the top down and focuses on fulfillment of system-level objectives. A characteristic of this approach is that it questions legacy solutions, shifting the focus towards opportunities to produce revolutionary results.

The DoE SunShot Initiative takes a pragmatic hybrid approach. Development of components and activities with low degrees of interdependence has been given low priority, while highly interdependent subsystems have been promoted and funded via systems design research projects. The Georgia Tech led SIMPLE BoS project is one such project that aims to reduce balance of system costs, a highly interdependent subsystem that has only recently been brought into the research domain. A key component of this interdependency is the need for better integration of PV systems with building systems, in a way that allows different aspects of building performance to remain uncompromised, and are eventually improved through PV system integration. The complexity inherent to the problem necessitates a multi-disciplinary approach and fuels the opportunity for transformational solutions.

Currently there are approximately 9,400 megawatts ("MW") of solar power production in the United States. Utility-scale ground mount accounts for 1,200 MW with an additional 16,000 MW of utility-scale projects currently in development. Utility-scale is defined by the National Renewable Energy Laboratory as a five megawatt or larger PV installation and therefore requires a substantially different approach to installation as compared to smaller residential or commercial rooftop projects. The sheer scale of most ground mount PV power plants, which can exceed tens of thousands of modules, offers an opportunity to rethink the process of installation at each step in order to yield maximum economic benefits for the industry. As the solar capacity continues to grow, there continues to be a desire for improved mounting systems that increase structural integrity and decrease installation costs. Various embodiments of the present invention address these desires.

BRIEF SUMMARY OF THE INVENTION

The present invention relates to truss mounting systems. An exemplary embodiment of the present invention provides a solar panel truss mounting system, comprising a base, a truss assembly, and a plurality of connectors. The truss assembly can be coupled to the base and can comprise a first panel rail mount, a second panel rail mount parallel to the first panel rail mount, a base rail mount parallel to the first and second panel rail mounts, and a plurality of support members. A first portion of the plurality of support members can extend between the first panel rail mount and the second panel rail mount. A second portion of the plurality of support members can extend between the first panel rail mount and the base rail mount. A third portion of the plurality of support members can extend between the second panel rail mount and the base rail mount. The plurality of connectors can be coupled to the truss assembly adjacent the first and second panel rail mounts. The connectors can be for coupling a plurality of photovoltaic solar panels to the truss assembly.

In some embodiments of the present invention, the second portion of the plurality of support members can comprise a first support member comprising a first end coupled to the first panel rail mount at a first position on the first panel rail mount and a second end coupled to the base rail mount at a first position on the base rail mount. The first end of the first support member can be formed by the intersection of a generally conical first portion and a first mounting tab. The first mounting tab can comprise a first curved surface and a first flat surface. The first curved surface can be curved along the lateral and longitudinal axis of the conical first portion, with a first end and a second end. The first flat surface can be disposed substantially tangent to the first curved surface, proximate the second end of the first curved surface. The first flat surface can further define a first mounting hole located proximate the center of the first flat surface.

In some embodiments of the present invention, the second portion of the plurality of support members can further comprise a second support member. The second support member can comprise a first end coupled to the first panel rail mount at the first position on the first panel rail mount and a second end coupled to the base rail mount at a second position on the base rail mount distinct from the first position on the base rail mount. The first end of the second support member can be formed by the intersection of a generally conical second portion and a second mounting tab. The second mounting tab can comprise a second curved surface, a second flat surface and a stiffener. The second curved surface can be curved along the lateral axis of the conical second portion, with a first end and a second end. The second flat surface can have a first end and a second end and can be disposed at an obtuse angle to the longitudinal axis of the second curved surface. The first end of the second flat surface can be disposed proximate the second end of the second curved surface. The stiffener can be disposed perpendicular to the perimeter of the second mounting tab. The height of the stiffener can taper from a first pre-determined height proximate the second end of the second flat surface to a smaller, second pre-determined height proximate the first end of the second curved surface. The second flat surface can further define a second mounting hole located proximate the center of the second flat surface In some embodiments of the present invention, the system further comprises a first fastener disposed through the first mounting hole and the second mounting hole. The first fastener and couple the first and second support members to the first panel rail mount.

In some embodiments of the present invention, the first support member can be of unitary construction.

In some embodiments of the present invention, the second end of the first support member can be formed by the intersection of a generally conical portion and a mounting tab. The mounting tab can comprise a curved surface, a flat surface, and a stiffener. The curved surface can be curved along the lateral axis of the conical portion, with a first end and a second end. The flat surface can have a first end and a second end and can be disposed at an obtuse angle to the longitudinal axis of the curved surface The first end of the flat surface can be disposed proximate the second end of the curved surface. The stiffener can be disposed perpendicular to the perimeter of the mounting tab. The height of the stiffener can taper from a first pre-determined height proximate the second end of the flat surface to a smaller, second pre-determined height proximate the first end of the curved surface. The flat surface can further define a third mounting hole located proximate the center of the second flat surface.

In some embodiments of the present invention, the second end of the second support member can be formed by the intersection of a generally conical portion and a first mounting tab. The first mounting tab can comprise a curved surface and a flat surface. The curved surface can be curved along the lateral and longitudinal axis of the conical portion, with a first end and a second end. The flat surface can be disposed substantially tangent to the curved surface, proximate the second end of the curved surface. The flat surface can further define a mounting hole located proximate the center of the flat surface.

In some embodiments of the present invention, the system can further comprise a third support member comprising a first end coupled to the first panel rail mount at a second position on the first panel rail mount and a second end coupled to the base rail mount at the first position on the base panel rail mount. The second end of the third support member can be formed by the intersection of a generally conical portion and a mounting tab. The mounting tab can comprise a curved surface and a flat surface. The curved surface can be curved along the lateral and longitudinal axis of the conical portion, with a first end and a second end. The flat surface can be disposed substantially tangent to the curved surface, proximate the second end of the curved surface. The flat surface can further define a fourth mounting hole located proximate the center of the flat surface.

In some embodiments of the present invention, the system can further comprise a second fastener disposed through the third mounting hole and the fourth mounting hole. The second fastener can couple the first and third support members to the base rail mount.

In some embodiments of the present invention, the system can further comprise a fourth support member comprising a first end coupled to the second panel rail mount at a first position on the second panel rail mount and a second end coupled to the base rail mount at the first position on the base rail mount. The second end can be formed by the intersection of a generally conical portion and a mounting tab. The mounting tab can comprise a curved surface and a flat surface. The curved surface can be curved along the lateral and longitudinal axis of the conical portion, with a first end and a second end. The flat surface can be disposed substantially tangent to the curved surface, proximate the second end of the curved surface. The flat surface can further define a fifth mounting hole located proximate the center of the flat surface.

In some embodiments of the present invention, the system can further comprise a fourth support member comprising a first end coupled to the second panel rail mount at a second position on the second panel rail mount and a second end coupled to the base rail mount at the first position on the base panel rail mount. The second end can be formed by the intersection of a generally conical portion, a mounting tab, and a stiffener. The mounting tab can comprise a curved surface and a flat surface. The curved surface can be curved along the lateral axis of the conical portion, with a first end and a second end. The flat surface can have a first end and a second end and can be disposed at an obtuse angle to the longitudinal axis of the curved surface. The first end of the flat surface can be disposed proximate the second end of the curved surface. The stiffener can be disposed perpendicular to the perimeter of the mounting tab. The height of the stiffener can taper from a first pre-determined height proximate the second end of the flat surface to a smaller, second pre-determined height proximate the first end of the curved surface. The flat surface can further define a sixth mounting hole located proximate the center of the flat surface.

In some embodiments of the present invention, the system can further comprise a third fastener disposed through the fifth mounting hole and the sixth mounting hole. The third fastener can couple the fourth and fifth support members to the base rail mount.

In some embodiments of the present invention, each of the support members in the second and third portions of the plurality of support members can be substantially equal in length.

In some embodiments of the present invention, each support member in the first, second, and third portions of the plurality of support members can be substantially equal in length.

In some embodiments of the present invention, the system further comprises a plurality of photovoltaic solar panels mounted to the truss assembly via the plurality of connectors.

In some embodiments of the present invention, at least one of the connectors is a dual-torque connector. The dual torque connect can comprises a female-helical-threaded aperture, a first mail-helical-threaded fastener, and a second male-helical threaded fastener. The female-helical-threaded aperture can be coupled to the first panel rail mount. The first male-helical-threaded fastener can extend through one of more support members in the plurality of support members and into a first end of the female-helical-threaded aperture. The first male-helical-threaded fastener can be subjected to a first amount of torque to couple the one or more of the support members to the first panel rail mount via cooperative engagement of the female-helical-threaded aperture with the first male-helical-threaded fastener. The second male-helical-threaded fastener can extend into a second end of the female-helical-threaded aperture. The second male-helical-threaded fastener can be subjected to a second amount of torque less than the first amount of torque to couple at least one photovoltaic solar panel in the plurality of photovoltaic solar panels to the first panel rail mount via cooperative engagement of the female-helical-threaded aperture with the second male-helical-threaded fastener.

In some embodiments of the present invention, at least one solar panel in the plurality of solar panels extends from a first end to a second end. A distance between the first end and the second end can be greater than a distance that is half of a distance between the first panel rail mount and the second panel rail mount. The first end can be positioned substantially at a midway point between the first panel rail mount and the second panel rail mount, such that the second end extends beyond the first panel rail mount.

In some embodiments of the present invention, the base comprises a ballast, a plurality of lateral channels, a first rail, a first base connection member, a second base connection member, a third base connection member, a fourth base connection member, a fifth base connection member, and a sixth base connection member. The ballast can comprise a first end, a second end, a first side, and a second side. The plurality of lateral channels can be coupled to the ballast and can extend from a first side to the second side of the ballast. The first rail can extend in a direction from the first end to the second end of the ballast. The first rail can be slideably-coupled to the plurality of lateral channels, allowing lateral movement of the first rail along the lateral channels. The first base connection member can comprise a first end and a second end. The first end can be slideably-coupled to the first rail at a first position on the first rail. The second end can be coupled to the first panel rail mount at a third position on the second panel rail mount. The second base connection member can comprise a first end and a second end. The first end can be slideably-coupled to the first rail at the first position on the first rail, and the second end can be coupled to the first panel rail mount at a fourth position on the second panel rail mount. The third base connection member can comprise a first end and a second end. The first end can be slideably-coupled to the first rail mount at a second position on the first rail mount, and the second end can be coupled to the first panel rail mount at the third position on the second panel rail mount. The fourth base connection member can comprise a first end and a second end. The first end can be slideably-coupled to the first rail mount at the second position on the first rail mount, and the second end can be coupled to the first panel rail mount at the fourth position on the second panel rail mount. The fifth base connection member can comprise a first end and a second end. The first end can be slideably-coupled to the first rail mount at a third position on the first rail mount, and the second end can be coupled to the base rail mount at a third position on the base rail mount. The sixth base connection member can comprise a first end and a second end. The first end can be slideably-coupled to the first rail mount at a fourth position on the first rail mount, and the second end can be coupled to the base rail mount at the third position on the base rail mount. The first, second, third, fourth, fifth, and sixth base connection members can be slideably-coupled to the first rail mount to allow the base connection members to move along the rail mount between a first end and a second end of the rail mount.

In some embodiments of the present invention, the first ends of each of the first, second, third, fourth, fifth, and sixth base connection members comprise a locking element for releaseably-engaging the first ends with the first rail mount. The locking elements can have an open position allowing the first ends to slide along the first rail mount and a closed position preventing the first ends from sliding along the first rail mount.

In some embodiments of the present invention, the ballast can be configured to rest on a surface. The ballast can have a weight sufficient to provide stability to the solar panel truss mounting system without requiring connection of the ballast to the surface.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIGS. 9A-9C provide top, side, and perspective views of a support member, in accordance with some exemplary embodiments of the present invention.

FIG. 12A-12C provide a side, top, and perspective view of a base, in accordance with some exemplary embodiments of the present invention.

FIGS. 13A-13B provide unfolded and folded views of connection elements, in accordance with exemplary embodiments of the present invention.

FIG. 13C provides a perspective view of a base, in accordance with some exemplary embodiments of the present invention.

DETAILED DESCRIPTION OF THE INVENTION

To facilitate an understanding of the principles and features of the present invention, various illustrative embodiments are explained below. To simplify and clarify explanation, the invention is described below as applied to solar panel mounting systems. One skilled in the art will recognize, however, that the invention is not so limited. Instead, as those skilled in the art would understand, the various embodiments of the present invention also find application in other areas where it may be desirable to provide structural support to a structure.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Figure 1:
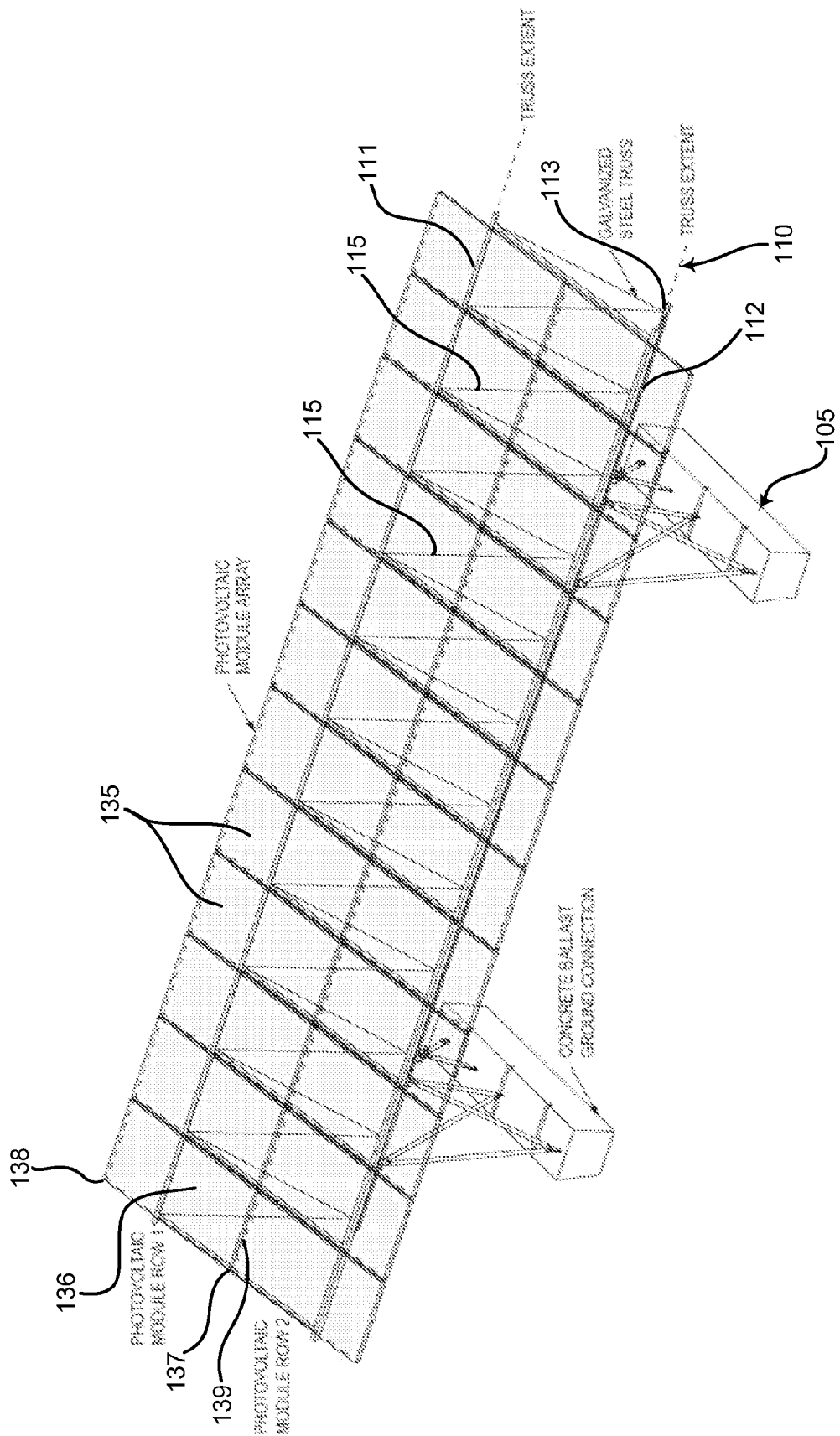
FIG. 1 provides a perspective view of a truss mounting system, in accordance with some exemplary embodiments of the present invention.
Figure 2:
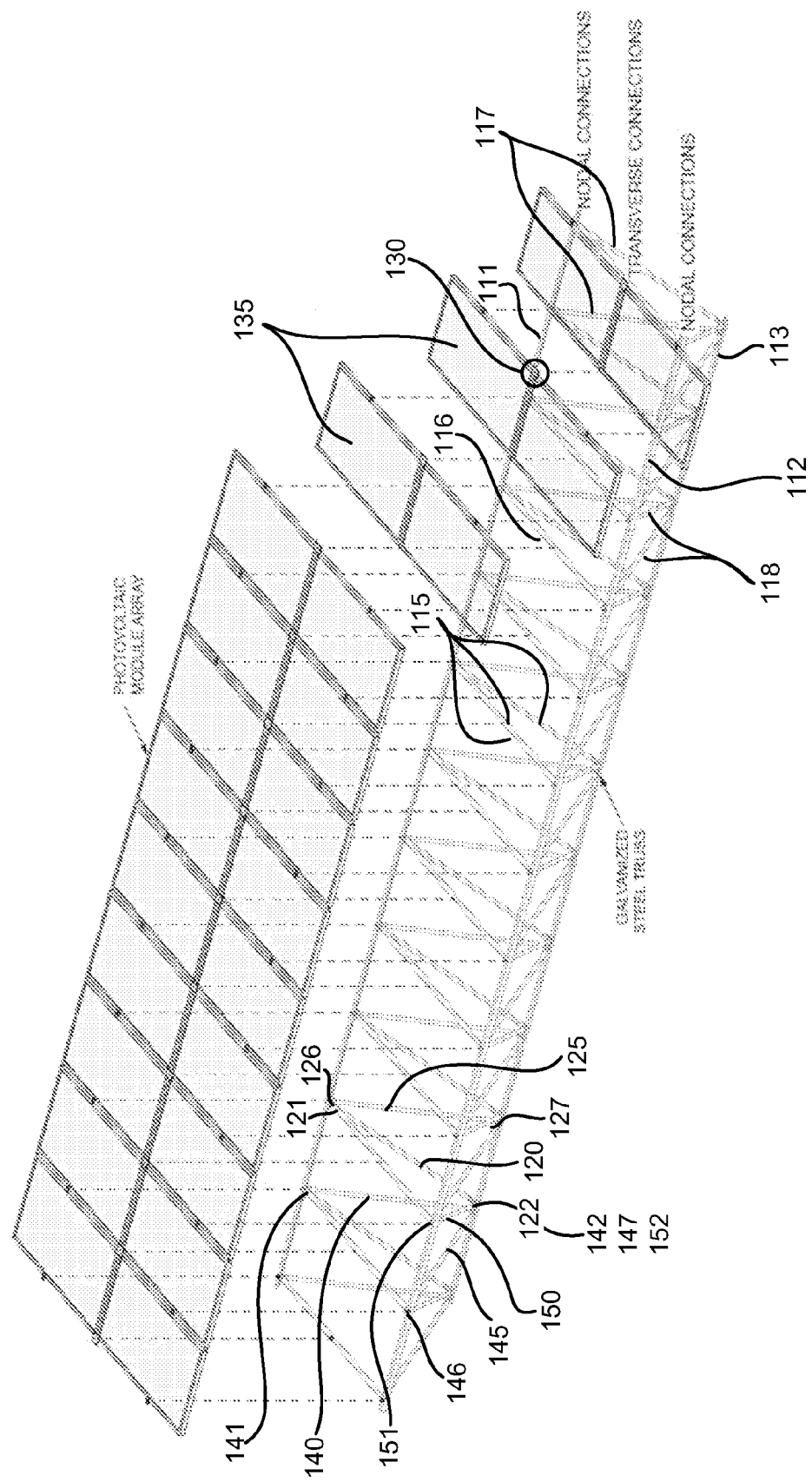
FIG. 2 provides a perspective view of a truss mounting system, in accordance with some exemplary embodiments of the present invention.
Figure 3:
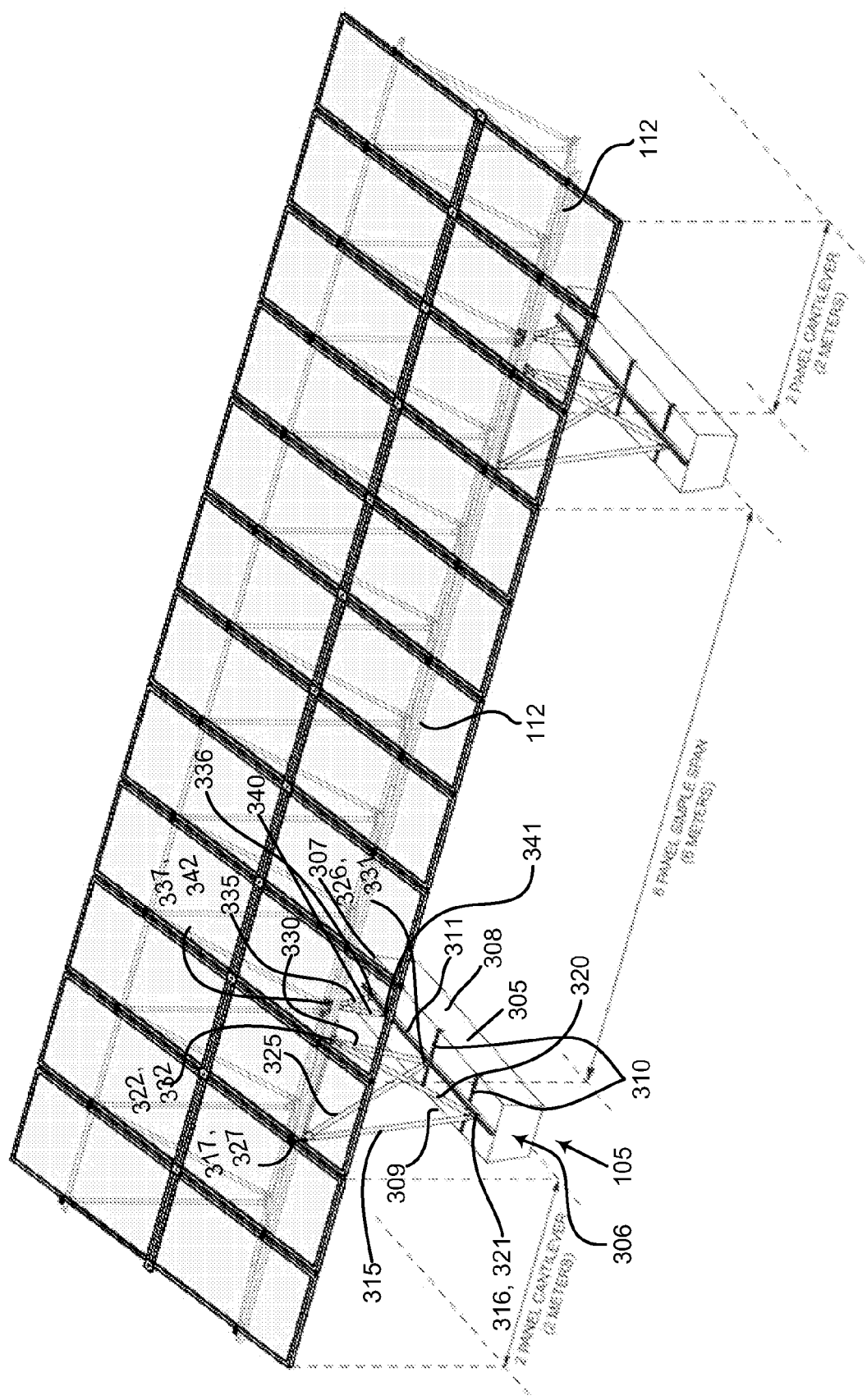
FIG. 3 provides a perspective view of a truss mounting system, in accordance with some exemplary embodiments of the present invention.
Figure 4:
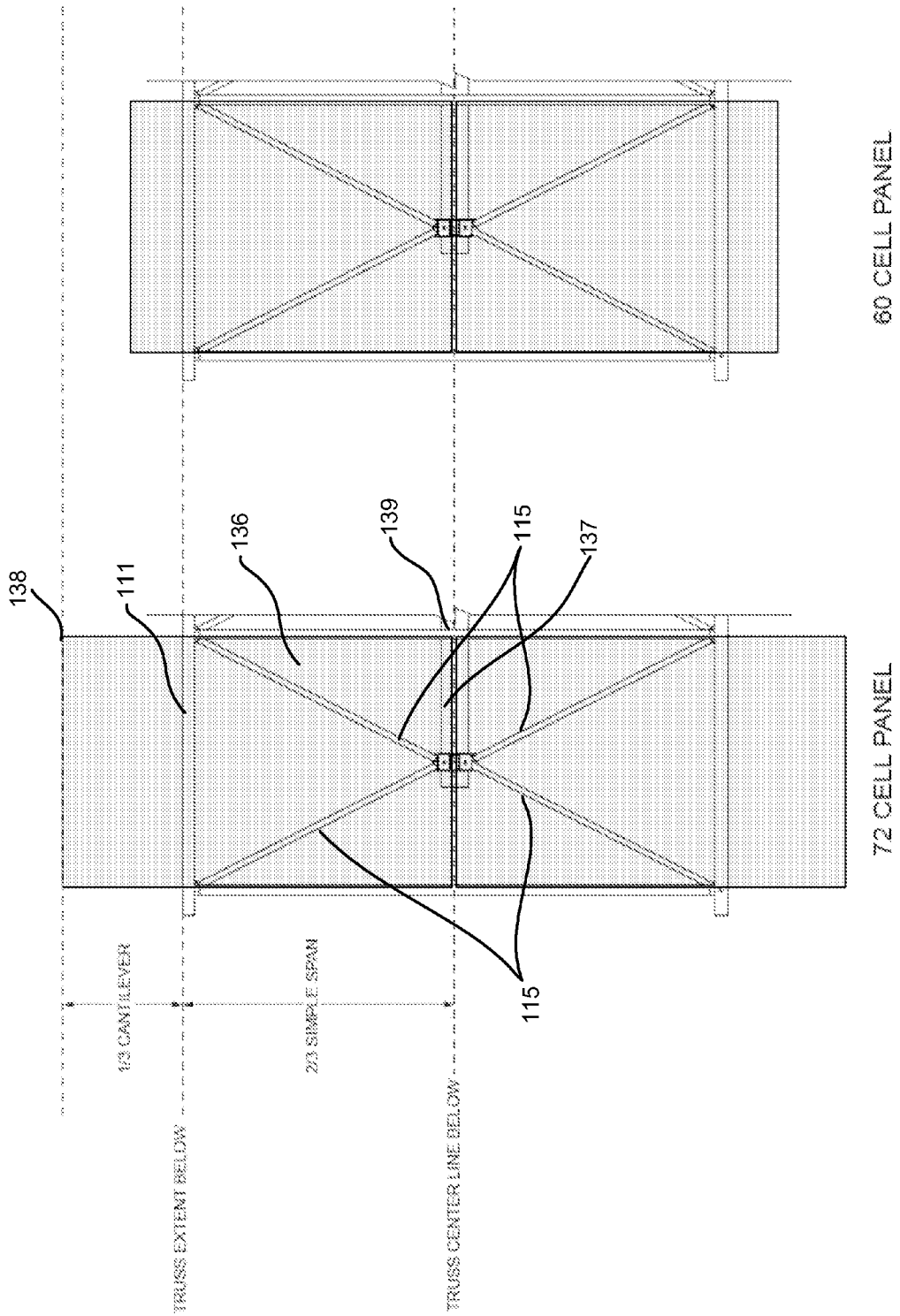
FIG. 4 provides a top view of a portion of a truss mounting system, in accordance with some exemplary embodiments of the present invention.
Figure 5:
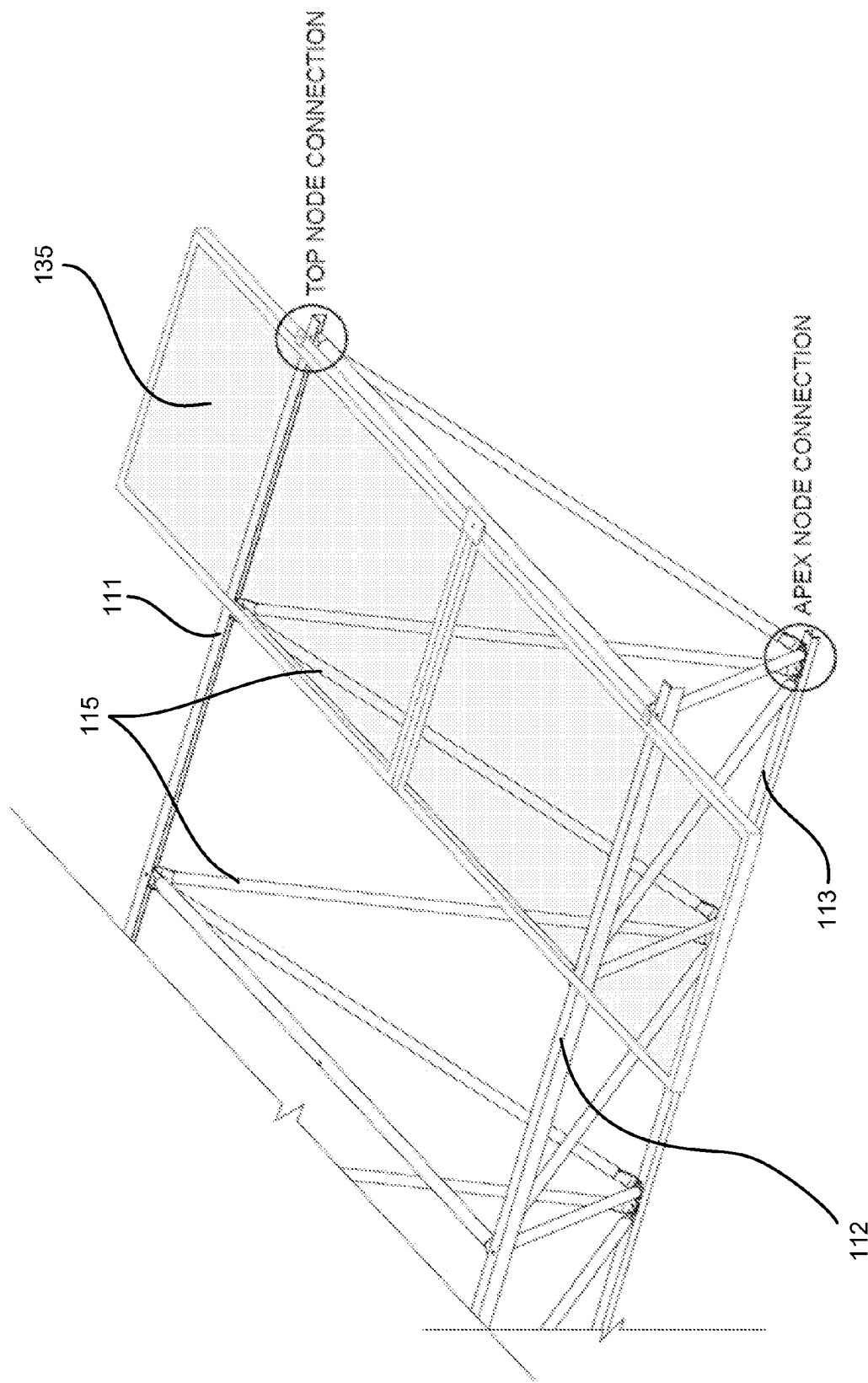
FIG. 5 provides a perspective view of a portion of a truss mounting system, in accordance with some exemplary embodiments of the present invention.

As shown in FIGS. 1-3, various exemplary embodiments of the present invention provides a truss mounting system. In its simplest form, the truss mounting system comprises a base 105 and a truss assembly 110 coupled to the base 105. The system can further comprise a plurality of connectors 130 coupled to the truss assembly 110. The plurality of connectors 130 can be used for coupling various devices to the truss assembly 110. In an exemplary embodiment of the present invention, the plurality of connectors 130 can be used to couple a plurality of photovoltaic solar panels 135 to the truss assembly 110.

The present invention provides many novel improvements to the conventional truss systems. Those improvements are described below in detail. Various embodiments of the present invention can employ one or more of these features. Additionally, while some of these features are discussed in the context of application to truss mounting systems, some of these features find applications in many applications, and thus, the scope of the present invention is not limited to using these features with only truss mounting systems. Instead, these features can stand alone as distinct inventions.

FIGS. 1-2 and 5-7 illustrate various portions of truss assemblies, in accordance with various embodiments of the present invention. As shown, in some embodiments of the present invention, the truss assembly 110 comprises a first panel rail mount 111, a second panel rail mount 112, a base rail mount 113, and a plurality of support members 115. The second panel rail mount 112 can be substantially parallel to the first panel rail mount 111. The base rail mount 113 can be substantially parallel to the first 111 and second 112 panel rail mount. A first portion 116 of the plurality of support members 115 can extend between the first panel rail mount 111 and the second panel rail mount 112. A second portion 117 of the plurality of support members 115 can extend between the first panel rail mount 111 and the base rail mount 113. A third portion 118 of the plurality of support members 115 can extend between the second panel rail mount 112 and the base rail mount 113. The plurality of connectors 130 can be adjacent the first 111 and/or second 112 panel rail mounts.

As shown in FIGS. 1-2 and 5-7, in some embodiments of the present invention, the truss assembly 110 can be arranged as a reverse pyramid truss system. Additionally, the size of the truss assembly 110 can be varied depending on a particular application due to a modular nature of the truss assembly 110.

The support members 115 of the present invention can be many different support members. The support members 115 can be used to provide structural support to the truss assembly 110. The amount of support provided by the support members 115 can depend on the structural shape of the ends of the support members 115. The ends of the support members 115 can determine how the connections to the panel rail mounts and base rail mount are made. The ends can have many different shapes in accordance with various embodiments of the present invention. For example, in some embodiments of the present invention, the first and/or second end of the support members 115 has a flattened end comprising a mounting hole. A fastener can be inserted through the mounting hold to connect the first support member. The flattened end, however, can lack ideal structural support because the flattened end can easily bend relative to the support member. Accordingly, the present invention provides improved structural ends to support members 115.

As shown in FIGS. 9A-9C, 10A-10C, and 11A-11C, an exemplary embodiment of the present invention provides a support member comprising a first end and a second end. The support member can have various cross-sectional shapes. In an exemplary embodiment of the present invention, the portion of the support member between the first and second ends is tube-shaped. The first end of the support member can have a "cobra-head" shape, described below. As the term "cobra-head" is used herein, an end has a cobra-head shape when the end is formed by the intersection of a generally conical portion 155 and a mounting tab 160. The first mounting tab comprises a curved surface 165 and a flat surface 170. The curved surface can be curved along the lateral and longitudinal axis of the conical portion 155, and can have a first end and a second end. The flat surface can be disposed substantially tangent to the curved surface 165, and can be proximate the second end of the curved surface 165. The flat surface further defines a mounting hole 175 located proximate the center of the flat surface 170. The second end of the support member can have a "copper-head" shape, described below. As the term "copper-head" is used herein, an end has a copper-head shape when the end is formed by the intersection of a generally conical portion 178, a mounting tab 180, and a stiffener 186. The mounting tab 180 can comprise a curved surface 182 and a second flat surface 178. The curved surface 182 can be curved along the lateral axis of the conical portion 178 and can have a first end and a second end. The flat surface 184 can have a first end and a second end and can be disposed at an obtuse angle to the longitudinal axis of the curved surface 182. The first end of the flat surface 184 can be disposed proximate the second end of the curved surface 182. The stiffener 186 can be disposed perpendicular to the perimeter of the mounting tab 180. The height of the stiffener 186 can taper from a first pre-determined height proximate the second end of the flat surface 184 to a smaller, second pre-determined height proximate the first end of the curved surface 182. The flat surface 184 further defines a second mounting hole 188 located proximate the center of the second flat surface 184.

To provide further structural integrity, in some embodiments of the present invention, the support members 115 of the present invention can be of unitary construction. As used herein, the term unitary construction means formed from a single piece of material. For example, the support members 115 can be cast to form the cobra-head and copper-head-shaped ends. Additionally, the support members 115 undergo a series of bends and folds to create the cobra-head and copper-head-shaped ends.

In some embodiments of the present invention, the second portion of the plurality of support members 115 comprises a first support member 120. The first support member 120 can comprise first end 121 coupled to the first panel rail mount 111 at a first position on the first panel rail mount 111 and a second end 122 coupled to the base rail mount 113 at a first position on the base rail mount 113. The first end 121 of the first support member 120 can have the cobra-head shape defined above.

In some embodiments of the present invention, the second portion of the plurality of support members 115 further comprises a second support member 125. The second support member 125 can comprise a first end 126 coupled to the first panel rail mount 111 at the first position on the first panel rail mount 111 and a second end 127 coupled to the base rail mount 113 at a second position on the base rail mount 113 distinct from the first position on the base rail mount 113. The first end 126 of the second support member 125 can have the copper-head shape defined above.

Figure 7:
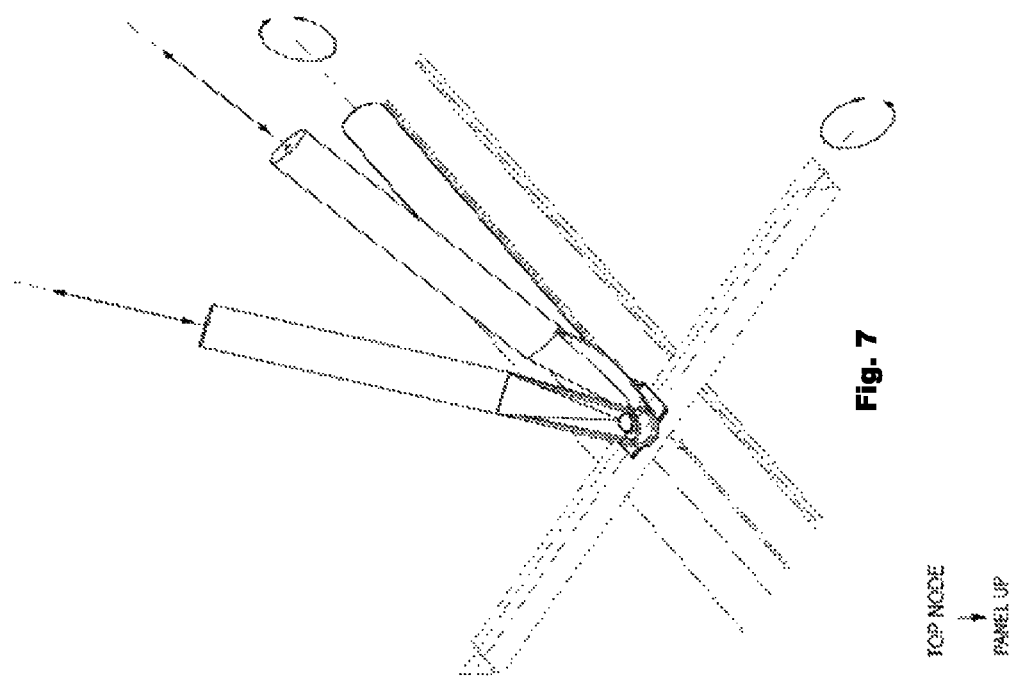
FIG. 7 provides a perspective view of a portion of a truss mounting system, in accordance with some exemplary embodiments of the present invention.

As shown in FIG. 7, in some embodiments of the present invention, the invention, the first 120 and second 125 support members 115 can be coupled to the first panel rail mount 111 via a fastener inserted through the mounting holes 175 188 defined by the cobra and copper heads on the first ends of the first 120 and second 125 support members 115. The fastener can be many fasteners known in the art, including, but not limited to, bolts, screws, pins, and the like.

In some embodiments of the present invention, the second end 122 of the first support member 120 can have the copper-head shape defined above, and the second end 127 of the second support member 125 can have the cobra-head shape defined above. The second ends 122 127 of the first 120 and second 125 support members 115 can be coupled to the base rail mount 113.

Figure 6:
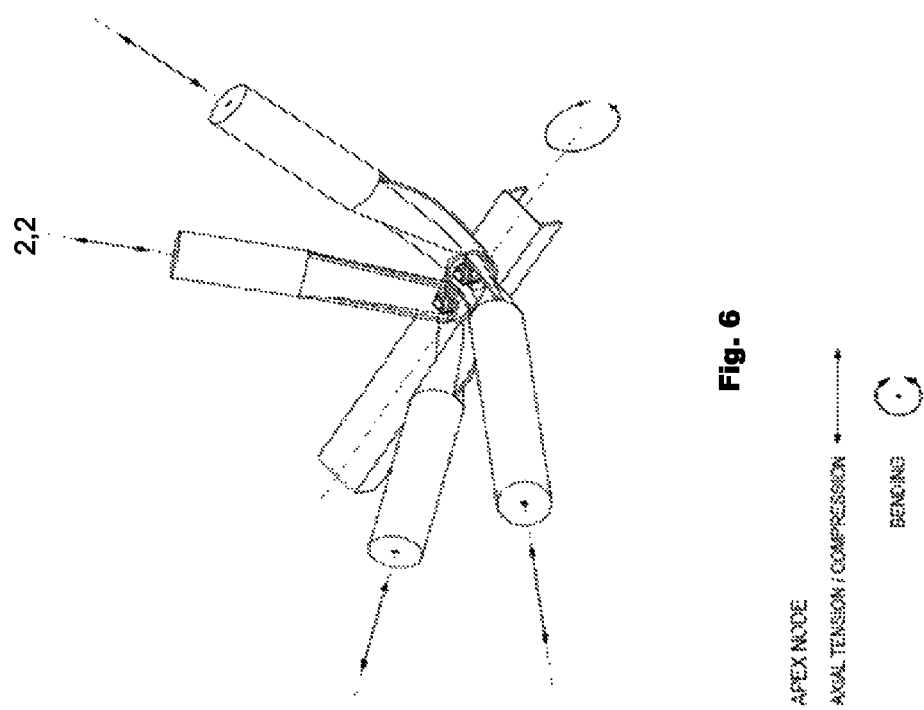
FIG. 6 provides a perspective view of a portion of a truss mounting system, in accordance with some exemplary embodiments of the present invention.

As shown in FIG. 6, in some embodiments of the present invention, ends of four support members 115 can come together at substantially the same position on the base rail mount 113. For example, the system can further comprise a third 140, fourth 145, and fifth 150 support members 115. The second end 122 of the first support member 120 can have the copper-head shape and can be coupled to the base rail mount 113 at first position on the base rail mount 113. The third support member 140 can comprising a first end 141 coupled to the second panel rail mount 112 at a first position on the second panel rail mount 112 and a second end 142 coupled to the base rail mount 113 at the first position on the base rail mount 113. The second end 142 can have the cobra-head shape defined above. The fourth support member 145 can comprise a first end 146 coupled to the second panel rail mount 112 at a second position on the second panel rail mount 112 and a second end 147 coupled to the base rail mount 113 at the first position on the base rail mount 112. The second end 147 can have the copper-head shape defined above. The fifth support member 150 can comprise a first end 151 coupled to the first panel rail mount 111 at a second position on the first panel rail mount 111 and a second end 152 coupled to the base rail mount 113 at the first position on the base rail mount 113. The second end 152 can have the cobra-head shape defined above. A second fastener can be disposed through the mounting holes defined by the second ends of the first 120 and third 140 support members 115 to couple the support members 115 to the base rail mount 113. A third fastener can be disposed through the mounting holes defined by the second ends 147 152 of the fourth 145 and fifth 150 support members 115 to couple the support members 115 to the base rail mount 113.

As discussed above, the truss assembly 110 can have many different shapes in accordance with various exemplary embodiments of the present invention. In an exemplary embodiment of the present invention, the truss assembly 110 can have a reverse-pyramid shape. For example, in some embodiments of the present invention, each of the support members 115 in the second 117 and third 118 portions of the plurality of support members 115 are substantially equal in length. In some embodiments of the present invention, each of the support members 115 in the first 116, second 117, and third 118 portions of the plurality of support members 115 are substantially equal in length.

As discussed above, in some embodiments of the present invention, the system can comprise a plurality of connectors 130 adjacent at least one of the first panel rail mount 111 and the second panel rail mount 112. The connectors 130 can be many connectors known in the art, including, but not limited to, a pin and aperture, a bolt, nut and aperture, and the like. In some embodiments of the present invention, the connectors 130 can be dual torque connectors, allowing connection of support members 115 to the first 111 or second panel rail mount 112 under a first amount of torque and connection of mountable devices, e.g., solar panels, under a second amount of torque. This offers significant improvement over conventional mounting systems where support members 115 and panels were connected via the same amount of torque, which could often damage the panels, as the panels were unable to withstand the torque necessary to adequately support the structure of the mounting systems. The dual-torque connectors also offer significant advantages by allowing a duel torque connection with a single connector, thus cutting down on the amount of hardware.

Figure 8:
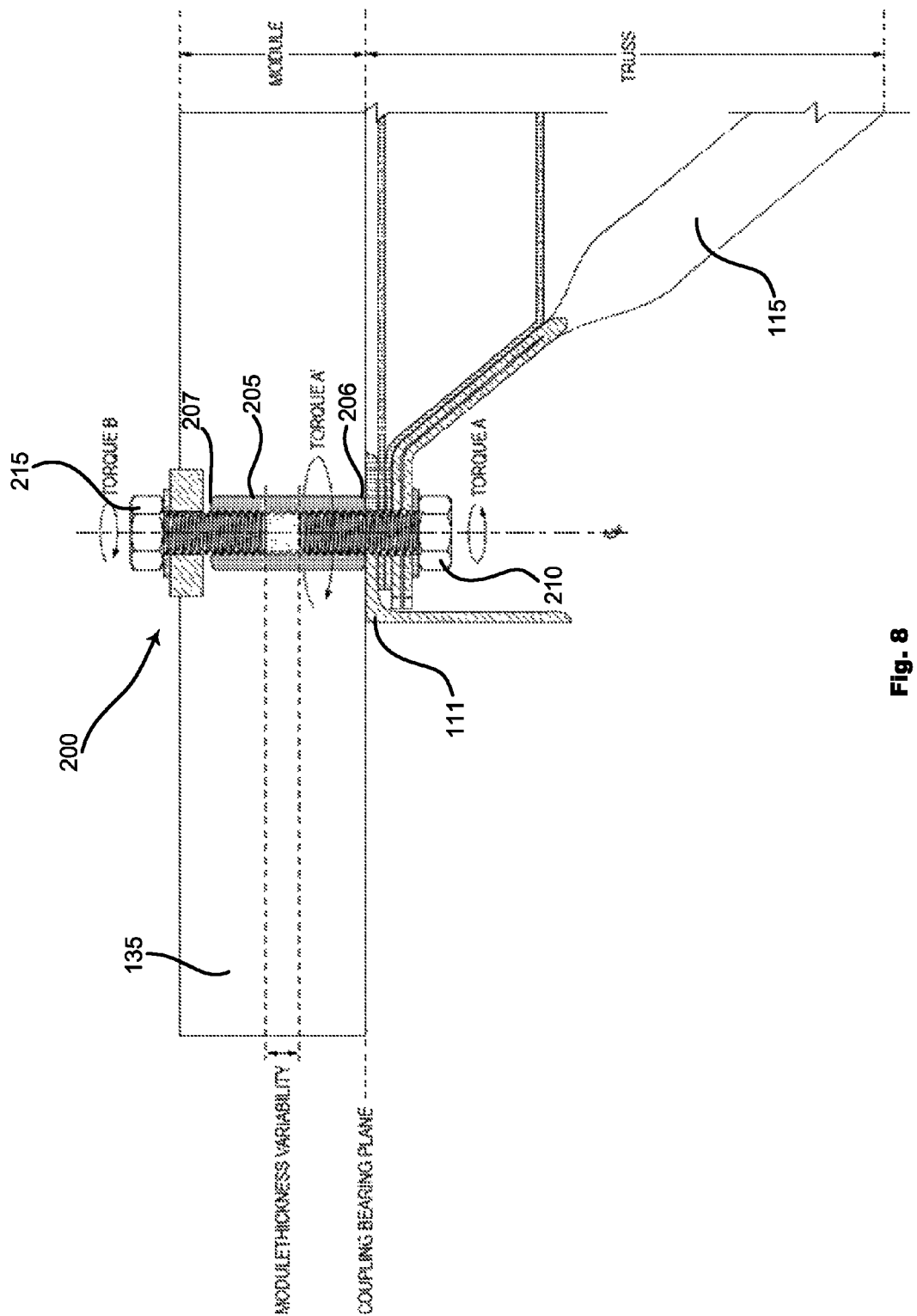
FIG. 8 provides a perspective view of a portion of a truss mounting system including a dual torque connector, in accordance with some exemplary embodiments of the present invention.
Figure 10C:
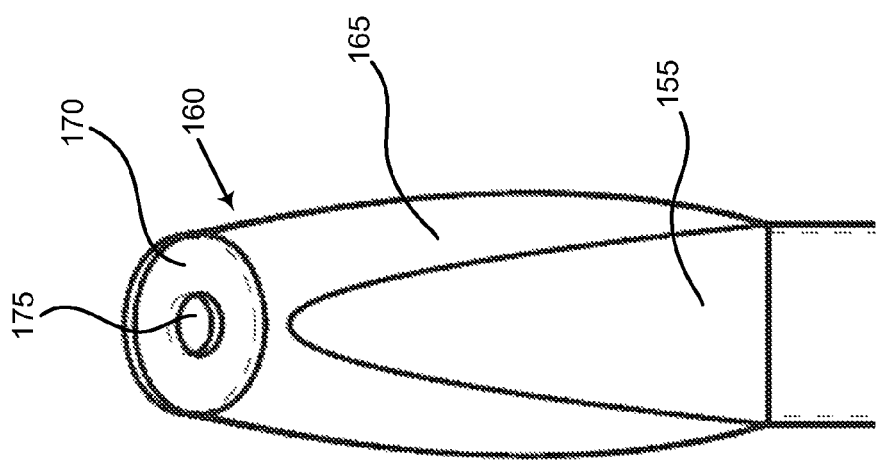
FIGS. 10A-10C provide perspective, side, and top views of an end of a support member, in accordance with some exemplary embodiments of the present invention.
Figure 10B:
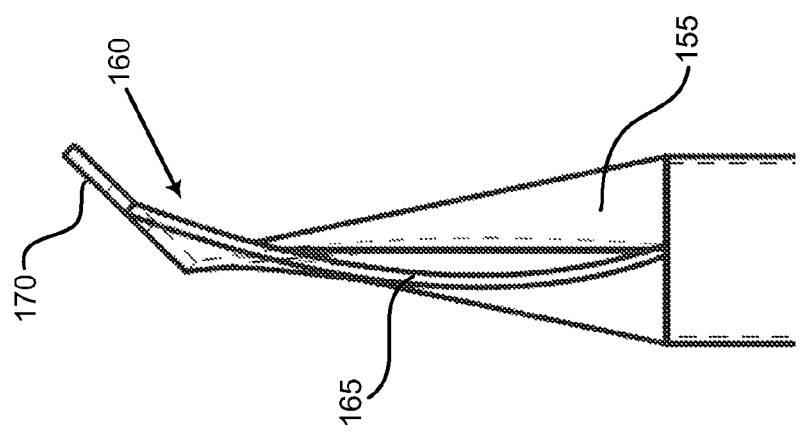
Figure 10A:
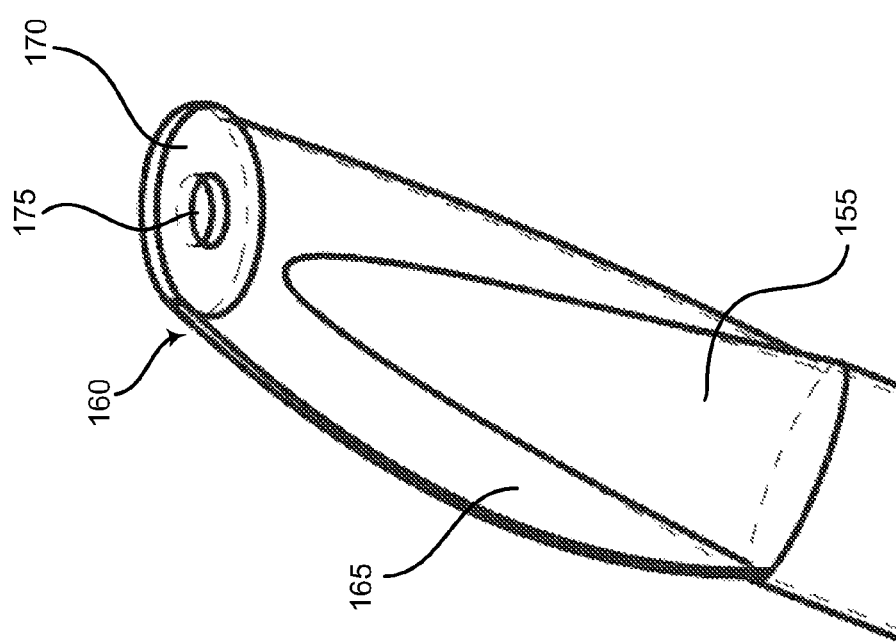
Figure 11C:
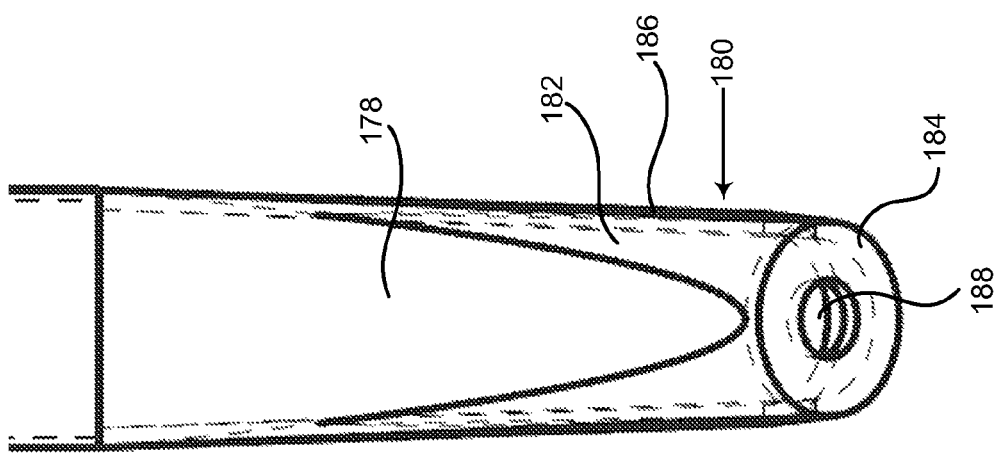
FIGS. 11A-11C provide perspective, side, and top views of an end of a support member, in accordance with some exemplary embodiments of the present invention.
Figure 11B:
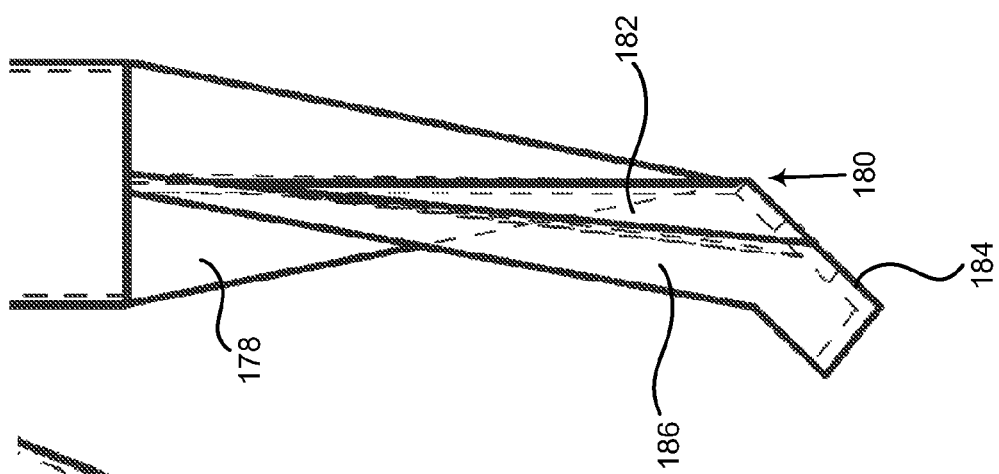
Figure 11A:
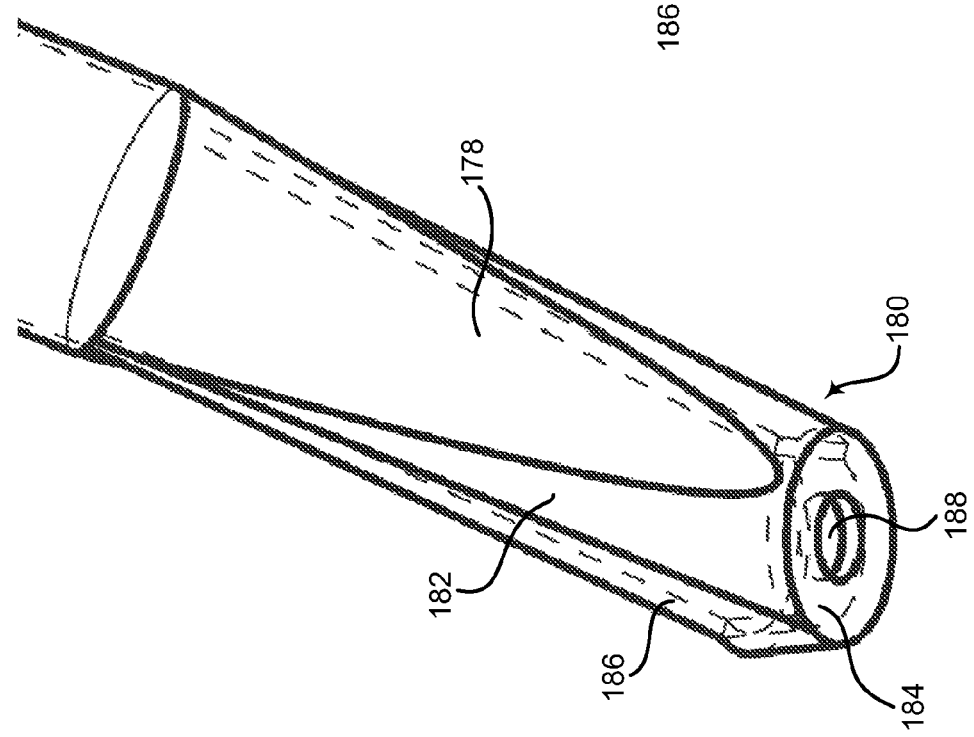
Figure 12B:
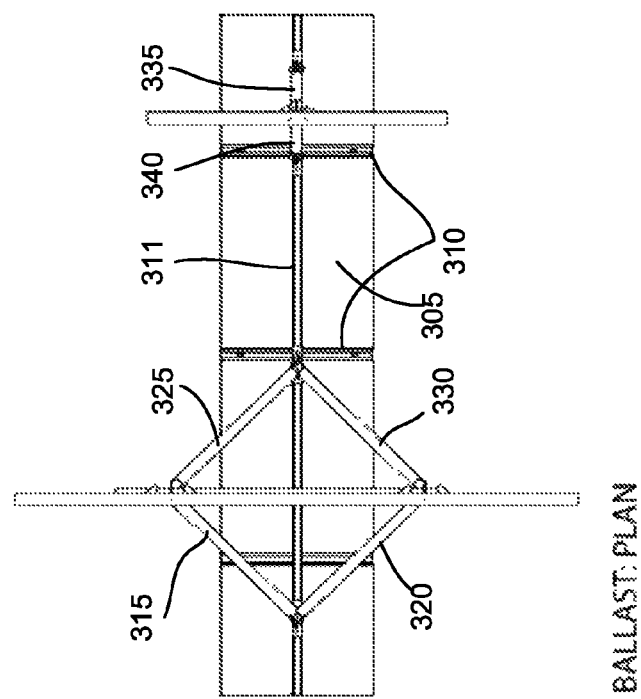
Figure 12A:
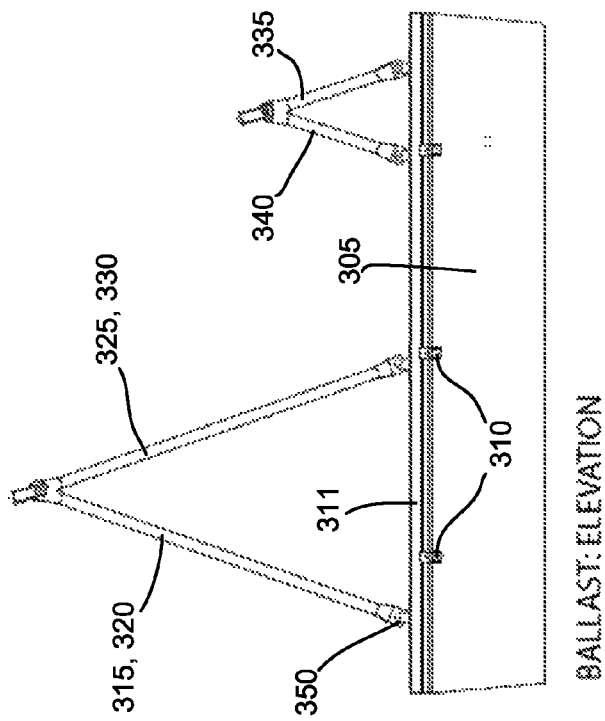

As shown in FIG. 8, a duel torque connector 200, in accordance with an exemplary embodiment of the present invention, can comprise a female-helical-threaded aperture 205 coupled to the first panel rail mount 111, a first male-helical threaded fastener 210, and a second male-helical-threaded fastener 210. The first male-helical-threaded fastener 210 can extend through one or more support members 115 in the plurality of support members 115 and into a first end 206 of the female-helical-threaded aperture 205. The first male-helical-threaded fastener 210 can be subjected to a first amount of torque to couple the one or more of the support members 115 to the first panel rail mount 111 via cooperative engagement of the female-helical-threaded aperture 205 with the first male-helical-threaded fastener 210. The second male-helical-threaded fastener 215 can extend into a second end 207 of the female-helical-threaded aperture 205. The second male-helical-threaded fastener 215 can be subjected to a second amount of torque less than the first amount of torque to couple at least one photovoltaic solar panel 135 in the plurality of photovoltaic solar panels to the first panel rail mount 111 via cooperative engagement of the female-helical-threaded aperture 205 with the second male-helical-threaded fastener 215.

The present invention can also offer the advantage of being adaptable to many different sizes of mountable devices to be mounted to the truss assembly 110. For example, as shown in FIGS. 1-4, the truss assembly 110 can accommodate solar panels of a variety of sizes or lengths. In an exemplary embodiment of the present invention at least one solar panel 136 in the plurality of solar panels 135 extends from a first end 137 to a second end 138. A distance between the first end 137 and the second end 138 can be greater than a distance that is half of a distance between the first panel rail mount 111 and the second panel rail mount 112. The first end 137 can be positioned substantially at a midway point 139 between the first panel rail mount 111 and the second panel rail mount 112, such that the second end 138 extends beyond the first panel rail mount 111. Accordingly, as the length of the solar panels increase or decrease, the amount of the panel extending beyond the first panel rail mount 111 would increase or decrease, but the panel is still accommodated by the truss assembly 110.

The present invention also provides improved bases over conventional mounting systems. For example, in some embodiments of the present invention, the base 105 allows the movement of the truss assembly 110 through several degrees of freedom, thus allowing the mounting system to be more easily adjusted to an optimal or desired position.

As shown in FIGS. 1, 3, 12A-12C, and 13C, in some embodiments of the present invention, the base 105 comprises a ballast 305, a plurality of lateral channels 310, a first rail 311, a first base connection member 315, a second base connection member 320, a third base connection member 325, a fourth base connection member 330, a fifth base connection member 335, and a sixth base connection member 340. The ballast 305 can comprise a first end 306, a second end 307, a first side 308, and a second side 309. The plurality of lateral channels 310 can be coupled to the ballast extending from the first side 308 to the second side 309 of the ballast 305. The plurality of channels 310 can be many different channels, including, but not limited to, rails, grooves in the ballast 305, and the like. The first rail 311 can extend in a direction from the first end 306 to the second end 307 of the ballast 305. The first rail 311 can be slideably-coupled to the plurality of lateral channels 310, allowing lateral movement of the first rail 311 along the lateral channels 310. The first base connection member 315 can comprise a first end 316 and a second end 317. The first end 316 can be slideably-coupled to the first rail 311 at a first position on the first rail 311, and the second end can be coupled to the first panel rail at a third position on the first panel rail mount 111. The second base connection member 320 can comprise a first end 321 and a second end 322. The first end can be slideably-coupled to the first rail 311 at the first position on the first rail 311, and the second end can be coupled to the first panel rail mount 111 at a fourth position on the first panel rail mount 111. The third base connection member 325 can comprise a first end 326 and a second end 327. The first end can be slideably-coupled to the first rail 311 at a second position on the first rail 311, and the second end can be coupled to the first panel rail mount 111 at the third position on the first panel rail mount 111. The fourth base connection member 330 can comprise a first end 331 and a second end 332. The first end slideably-coupled to the first rail 311 at the second position on the first rail 311, and the second end can be coupled to the first panel rail mount 111 at the fourth position on the first panel rail mount 111. The fifth base connection member 335 can comprise a first end 336 and a second end 337. The first end can be slideably-coupled to the first rail 311 at a third position on the first rail 311, and the second end can be coupled to the base rail mount at a third position on the base rail mount. The sixth base connection member 340 can comprise a first end 341 and a second end 342. The first end can be slideably-coupled to the first rail 311 at a fourth position on the first rail 311, and the second end 342 can be coupled to the base rail mount 113 at the third position on the base rail mount 113.

As discussed above, various connection members of the base 105 can be slideably-coupled to the first rail 311 allowing the first ends of the connection members to move or slide along the first rail 311 between a first end and second end of the first rail. To allow for the slideable-coupling of the connection members, in some embodiments of the present invention, the first ends of each of the first 315, second 320, third 325, fourth 330, fifth 335, and sixth 340 base connection members comprise a locking element 350 for releaseably-engaging the first ends with the first rail 311. As shown in FIGS. 12A-12C and 13A-13C, the locking elements 350 can have an open position allowing the first ends to slide along the first rail and a closed or locked position preventing the first ends from sliding along the first rail 311. For example, the locking elements can comprise pin connections. The pin connections can be loosened to allow movement and tightened to prevent movement.

Accordingly, the truss assembly 110 can move in various directions about the base 105. For example, moving each of the connection members an equal amount along the first rail 311 allows the truss assembly 110 to move in the direction from the first end to the second end of the first rail 311. Moving the first 315 and second 320 connection members closer to or further away from the third 325 and fourth 330 connection members allows the truss assembly 110 to tilt up or down as the second panel rail mount 112 is raised or lowered, accordingly. The first rail 311 can slide laterally along the plurality of lateral channels 310, allowing the truss assembly 110 to move in a direction from the first side 308 to the second side 309 of the ballast. The base 105 described above also allows additional movements of the truss assembly 110 as would be understood by those skilled in the art.

Another advantage provided by some embodiments of the present invention is due to the ease of installation of the base 105. For example, in some embodiments the ballast 305 is configured to rest on a surface. The ballast 305 can have a weight sufficient to provide stability to the solar panel truss mounting system, without requiring connection of the ballast 305 to the surface. For example, in some embodiments, the ballast 305 can be formed of a heavy material, such as concrete, and can rest on the ground. Thus, it may not be necessary to further connect the ballast 305 to the surface, e.g. ground, through anchors or other means. This feature can allow the base 105 to be easily installed. Of course, in some embodiments of the present invention, the ballast 305 is not used, or it is not required to be very heavy, such that the ballast 305 or simply the lateral channels 310 can be mounted to a surface. These embodiments may find application in situations where it is not desirable to add additional weight to the mounting system, e.g., when the system is mounted to the roof of a building.

Those skilled in the art would appreciate the major improvements provided by the various embodiments described above over conventional systems. For example, the present invention provided many process improvements over convention systems. Various embodiments of the present invention can allow for a mega-array to be pre-assembled, pre-wired, partially pre-grounded and electrically tested in a central controlled environment and then transported into its final position via lifting equipment. The present invention can also allow for indoor or tent-protected pre-assembly of modules providing improved worker safety, improved efficiency, improved comfort and protection from the elements, extended workdays and elimination of time lost due to inclement weather (mega-arrays can be assembled indoors regardless of weather), and can accommodate modest automation of array assembly using robotic arms if desired. Additionally, less damage to modules due to improved handling is also expected to yield fewer module failures in the installed array. The present invention can also reduce the amount of time and labor required to assemble complete mega-arrays due to improved work environment, pre-assembly, working jigs and indices, applications of automated processes, reduced part count, and reduced tool count and tool complexity. For example, in some embodiments, the entire mega-array can be assembled with functioning modules using a single ratcheted socket or impact driver in approximately 4 man-hours. The present invention can also require very little assembly infrastructure, therefore allowing local mobilization of existing leasable warehouse space or large-scale tent for pre-assembly. Connections in some embodiments of the present invention have been optimized in the design in order to reduce part count and reduce assembly labor and complexity. As discussed above, ground/base connections can be designed to allow for high degrees of adjustability in the field to accommodate faster and easier installation and more options for array tilt angle positioning.

Various embodiments of the present invention also provide many material improvements over conventional systems. For example, some embodiments of the present invention can be constructed solely of structural components made from low-cost ubiquitously available galvanized steel members in place of custom aluminum extrusions. This material change can provide immediate impact given lower steel prices and will continue to yield additional benefits as aluminum prices are predicted to increase significantly in the near future. Additionally, the truss assembly 110 of the present invention can allow the array to span much further between supports thus reducing the number of costly ground connections required per watt adding to the overall system savings. Further, in some embodiments, electrical homeruns can be integrated into the base rail mount of the truss assembly 110 during the pre-assembly process eliminating the need to construct electrical homeruns of rigid conduit and pulled wire in the field. This homerun management system can allow for ease of access for inspection and maintenance throughout the system's service life.

Various embodiments of the present invention also provide application improvements over conventional systems. For example, some embodiments of the present invention can be deployed in ground mount utility installations, long span canopies over surface parking lots, on low slope commercial roofs with complex mechanical configurations, and over public spaces to provide shade. Some embodiments of the present invention can be deployed as a canopy structure to allow for multi-functional programming of the space below allowing customers to maximize utilization of land. Additionally, some embodiments of the present invention can work with a majority of frame types from leading manufacturers. A survey of the most widely used modules shows that some embodiments of the present invention can be used with more than 85% of commercially available mono-crystalline and poly-crystalline silicon modules. Some embodiments of the present invention can be installed quickly with minimal disruption to a site and/or business due to the nature of its off-site pre-assembly process. Installations can occur over existing operational surface parking lots by installing preconfigured mega-arrays that have been assembled nearby during off business hours. Some embodiments of the present invention can be easily disconnected and relocated as complete mega-arrays, essentially picking up 24, or more, modules at once and moving them to a new location without any additional assembly labor. This represents a tremendous advantage in a third-party finance environment where systems may need to be relocated after a multiyear lease expires. This transportability also allows system owners to realistically consider selling their solar system in the future as a commoditized asset.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A truss mounting system, comprising
a base;
a truss assembly coupled to the base, wherein the truss assembly comprises:
  a first panel rail mount;
  a second panel rail mount parallel to the first panel rail mount;
  a base rail mount parallel to the first and second panel rail mounts; and
  a plurality of support members, a first portion of the plurality of support members extending between the first panel rail mount and the second panel rail mount, a second portion of the plurality of support members extending between the first panel rail mount and the base rail mount, and a third portion of the plurality of support members extending between the second panel rail mount and the base rail mount, wherein the second portion of the plurality of support members comprises:
    a first support member, the first support member comprising a first end coupled to the first panel rail mount at a first position on the first panel rail mount and a second end coupled to the base rail mount at a first position on the base rail mount, the first end formed by the intersection of a generally conical first portion and a first mounting tab, the first mounting tab comprising:
      a first curved surface, curved along the lateral and longitudinal axis of the conical first portion, with a first end and a second end; and
      a first flat surface disposed substantially tangent to the first curved surface, proximate the second end of the first curved surface, wherein the first flat surface further defines a first mounting hole located proximate the center of the first flat surface; and
    a second support member, the second support member comprising a first end coupled to the first panel rail mount at the first position on the first panel rail mount and a second end coupled to the base rail mount at a second position on the base rail mount distinct from the first position on the base rail mount, the first end formed by the intersection of a generally conical second portion and a second mounting tab, the second mounting tab comprising:
      a second curved surface, curved along the lateral axis of the conical second portion, with a first end and a second end;
      a second flat surface, with a first end and a second end, disposed at an obtuse angle to the longitudinal axis of the second curved surface, the first end of the second flat surface disposed proximate the second end of the second curved surface, wherein the second flat surface further defines a second mounting hole located proximate the center of the second flat surface; and
      a stiffener disposed perpendicular to the perimeter of the second mounting tab, wherein the height of the stiffener tapers from a first pre-determined height proximate the second end of the second flat surface to a smaller, second pre-determined height proximate the first end of the second curved surface;
  a first fastener disposed through the first mounting hole and the second mounting hole, the first fastener coupling the first and second support members to the first rail mount; and
  a plurality of connectors coupled to the truss assembly adjacent the first and second panel rail mounts, the connectors for coupling one or more mountable devices to the truss assembly, wherein at least one connector in the plurality of connectors comprises:
    a female-helical-threaded aperture coupled to the first panel rail mount;
    a first male-helical-threaded fastener extending through one or more of the plurality of support members of the truss assembly and into a first end of the female-helical-threaded aperture, the first male-helical-threaded fastener subjected to a first amount of torque to couple the one or more of the support members to the first panel rail mount of the truss assembly via cooperative engagement of the female-helical-threaded aperture with the first male-helical-threaded fastener; and
    a second male-helical-threaded fastener extending into a second end of the female-helical-threaded aperture, the second male-helical-threaded fastener subjected to a second amount of torque less than the first amount of torque to couple the one or more mountable devices to the first panel rail mount via cooperative engagement of the female-helical-threaded aperture with the second male-helical-threaded fastener.

2. The truss mounting system of claim 1, wherein the base comprises:
a ballast comprising a first end, a second end, a first side, and a second side;
a plurality of lateral channels coupled to the ballast extending from the first side to the second side of the ballast;
a first rail extending in a direction from the first end to the second end of the ballast, the first rail slideably-coupled to the plurality of lateral channels, allowing lateral movement of the first rail along the lateral channels;

a first base connection member comprising a first end and a second end, the first end slideably-coupled to the first rail at a first position on the first rail, the second end coupled to the first panel rail mount at a third position on the first panel rail mount;

a second base connection member comprising a first end and a second end, the first end slideably-coupled to the first rail at the first position on the first rail, the second end coupled to the first panel rail mount at a fourth position on the first panel rail mount;

a third base connection member comprising a first end and a second end, the first end slideably-coupled to the first rail at a second position on the first rail, the second end coupled to the first panel rail mount at the third position on the first panel rail mount;

a fourth base connection member comprising a first end and a second end, the first end slideably-coupled to the first rail at the second position on the first rail, the second end coupled to the first panel rail mount at the fourth position on the first panel rail mount;

a fifth base connection member comprising a first end and a second end, the first end slideably-coupled to the first rail at a third position on the first rail, the second end coupled to the base rail mount at a third position on the base rail mount; and a sixth base connection member comprising a first end and a second end, the first end slideably-coupled to the first rail at a fourth position on the first rail, the second end coupled to the base rail mount at the third position on the base rail mount, wherein the first, second, third, fourth, fifth, and sixth base connection members are slideably-coupled to the first rail mount to allow the base connection members to move along the rail mount between a first end and a second end of the first rail, and wherein the ballast is configured to rest on a surface, and wherein the ballast has a weight sufficient to provide stability to the truss mounting system, without requiring connection of the ballast to the surface.

3. The truss mounting system of claim 2, wherein the second end of the first support member is formed by the intersection of:

a generally conical portion;

a mounting tab comprising:
  a curved surface, curved along the lateral axis of the conical portion, with a first end and a second end; and
  a flat surface, with a first end and a second end, disposed at an obtuse angle to the longitudinal axis of the curved surface, the first end of the flat surface disposed proximate the second end of the curved surface, wherein the flat surface further defines a third mounting hole located proximate the center of the flat surface; and a stiffener disposed perpendicular to the perimeter of the mounting tab, wherein the height of the stiffener tapers from a first pre-determined height proximate the second end of the flat surface to a smaller, second pre-determined height proximate the first end of the curved surface; and wherein the system further comprises:

a third support member comprising a first end coupled to the first panel rail mount at a second position on the first panel rail mount and a second end coupled to the base rail mount at the first position on the base panel rail mount, the second end formed by the intersection of:

a generally conical portion; and
  a first mounting tab comprising:
    a curved surface, curved along the lateral and longitudinal axis of the conical portion, with a first end and a second end; and
    a flat surface disposed substantially tangent to the curved surface, proximate the second end of the curved surface, wherein the flat surface further defines a fourth mounting hole located proximate the center of the flat surface;

a second fastener disposed through the third mounting hole and the fourth mounting hole, the second fastener coupling the first and third support members to the base rail mount;

a fourth support member comprising a first end coupled to the second panel rail mount at a first position on the second panel rail mount and a second end coupled to the base rail mount at the first position on the base panel rail mount, the second end formed by the intersection of:

a generally conical portion; and
  a first mounting tab comprising:
    a curved surface, curved along the lateral and longitudinal axis of the conical portion, with a first end and a second end; and
    a flat surface disposed substantially tangent to the curved surface, proximate the second end of the curved surface, wherein the flat surface further defines a fifth mounting hole located proximate the center of the flat surface;

a fifth support member comprising a first end coupled to the second panel rail mount at a second position on the second panel rail mount and a second end coupled to the base rail mount at the first position on the base panel rail mount, the second end is formed by the intersection of:

a generally conical portion;
  a mounting tab comprising:
    a curved surface, curved along the lateral axis of the conical portion, with a first end and a second end; and
    a flat surface, with a first end and a second end, disposed at an obtuse angle to the longitudinal axis of the curved surface, the first end of the flat surface disposed proximate the second end of the curved surface, wherein the flat surface further defines a sixth mounting hole located proximate the center of the flat surface; and a stiffener disposed perpendicular to the perimeter of the mounting tab, wherein the height of the stiffener tapers from a first pre-determined height proximate the second end of the flat surface to a smaller, second pre-determined height proximate the first end of the curved surface; and a third fastener disposed through the fifth mounting hole and the sixth mounting hole, the third fastener coupling the fourth and fifth support members to the base rail mount.

4. The truss mounting system of claim 3, wherein the first ends of each of the first, second, third, fourth, fifth, and sixth base connection members comprise a locking element for releaseably-engaging the first ends with the first rail, the locking elements having an open position allowing the first ends to slide along the first rail and a closed position preventing the first ends from sliding along the first rail.

* * * * *